United States Patent [19]
Naito

[11] Patent Number: 4,705,126
[45] Date of Patent: Nov. 10, 1987

[54] SIGNAL PROCESSING CIRCUIT AND WEIGHING APPARATUS INCORPORATING SAME

[75] Inventor: Kazufumi Naito, Ohtsu, Japan

[73] Assignee: Ishida Scales Manufacturing Company, Ltd., Kyoto, Japan

[21] Appl. No.: 905,876

[22] Filed: Sep. 10, 1986

[30] Foreign Application Priority Data

Sep. 24, 1985 [JP] Japan ............................... 60-210565
Nov. 18, 1985 [JP] Japan ............................... 60-258379
Dec. 27, 1985 [JP] Japan ............................... 60-298746

[51] Int. Cl.⁴ ............... G01G 19/52; G01G 23/10; G01L 25/00; G01L 1/22
[52] U.S. Cl. ................................. 177/50; 177/185; 73/1 B; 73/862.67
[58] Field of Search ............... 177/50, 185; 73/1 B, 73/862.67; 364/724

[56] References Cited

U.S. PATENT DOCUMENTS

| | | | |
|---|---|---|---|
| 4,139,069 | 2/1979 | Domis et al. | 177/50 X |
| 4,531,600 | 7/1985 | Langlais et al. | 73/862.67 X |
| 4,535,854 | 8/1985 | Gard et al. | 177/50 X |
| 4,572,309 | 2/1986 | Nishiyama | 177/50 |
| 4,580,644 | 4/1986 | Nishiyama | 73/1 B |
| 4,633,425 | 12/1986 | Senderowicz | 364/724 X |

Primary Examiner—George H. Miller, Jr.
Attorney, Agent, or Firm—Flehr, Hohbach, Test, Albritton & Herbert

[57] ABSTRACT

A signal processing circuit for a weighing apparatus comprises an amplifier circuit for amplifying a weight signal outputted from a weighing device, an active filter which serves to attenuate noise components in the weight signal from the amplifier circuit, and switches for selecting whether the active filter should function as a filter or a buffer according to a predetermined timing schedule.

42 Claims, 25 Drawing Figures

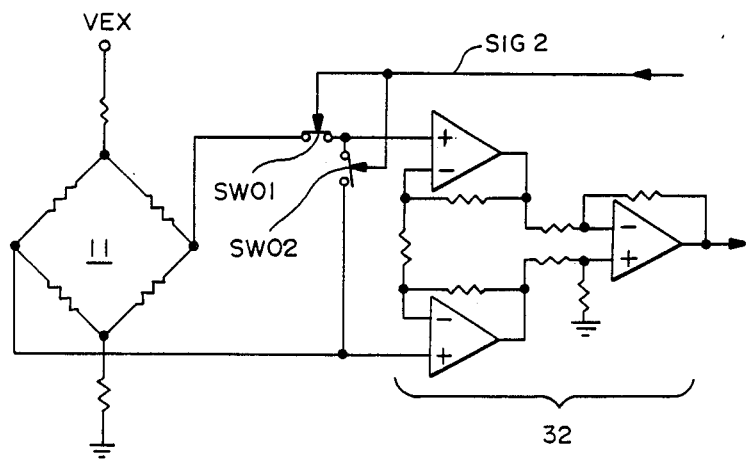
FIG.—8
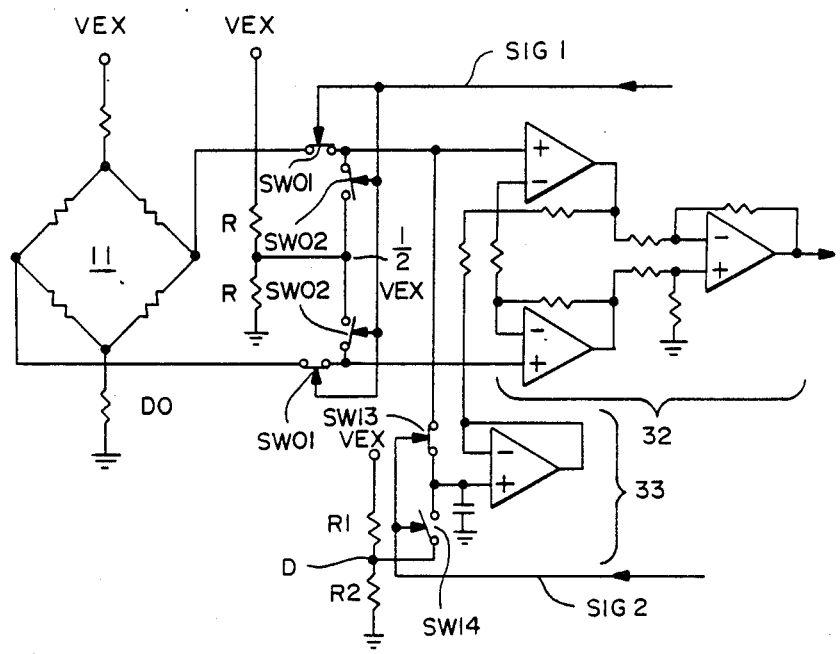
FIG.—9

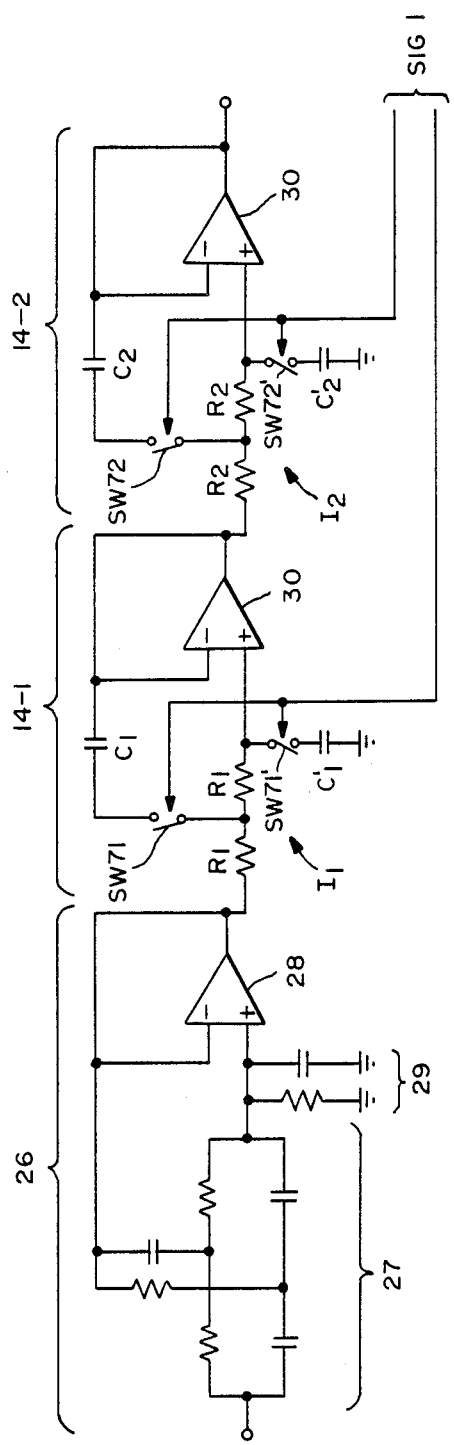
FIG.—13

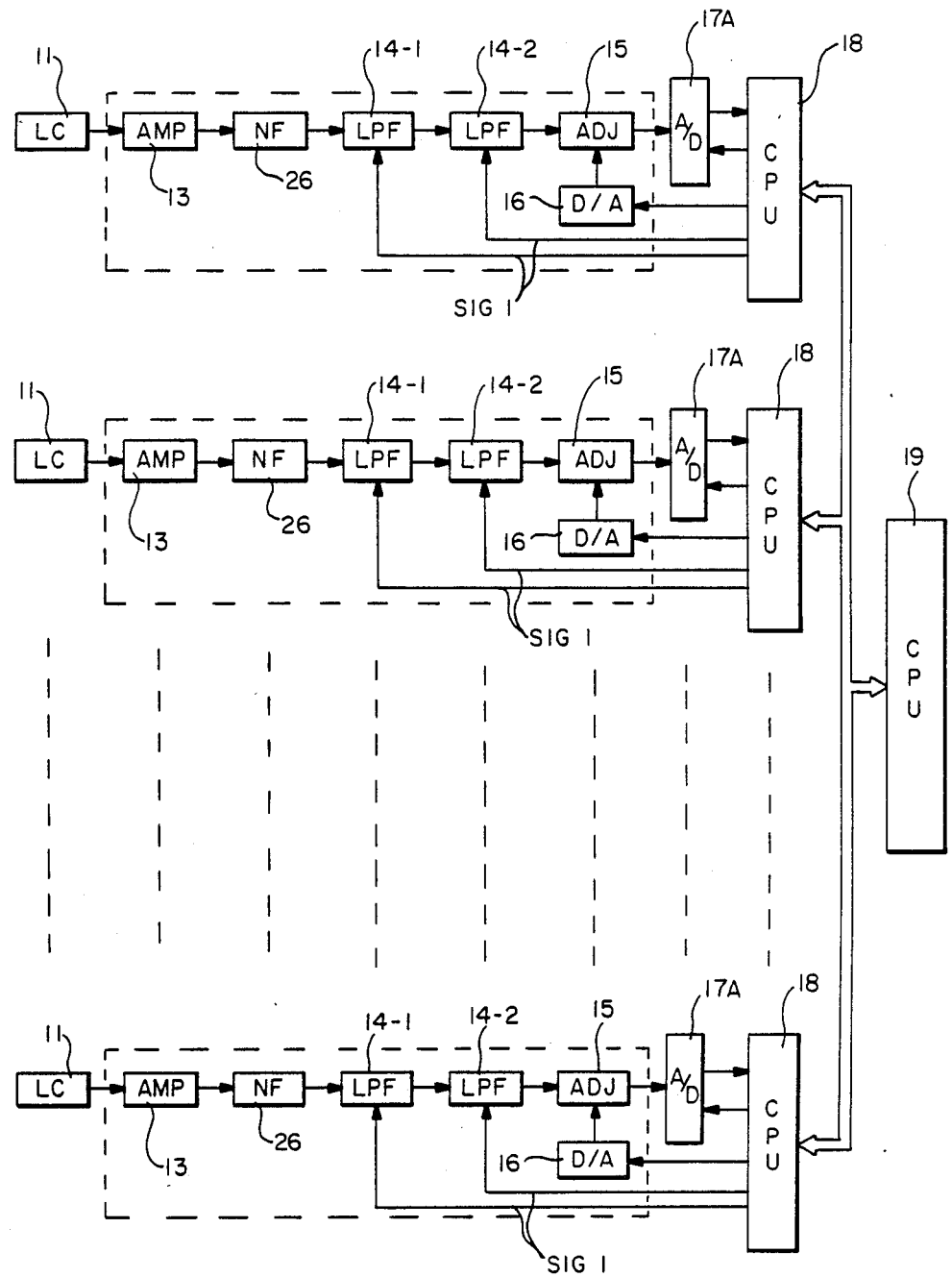
FIG.—14

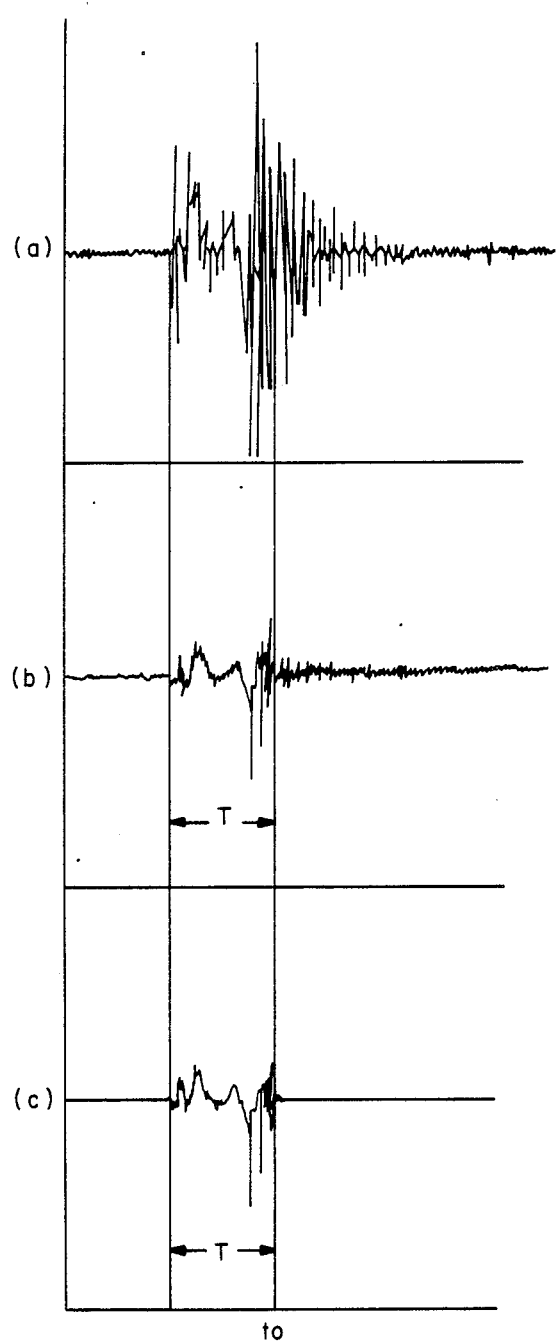
FIG.—16

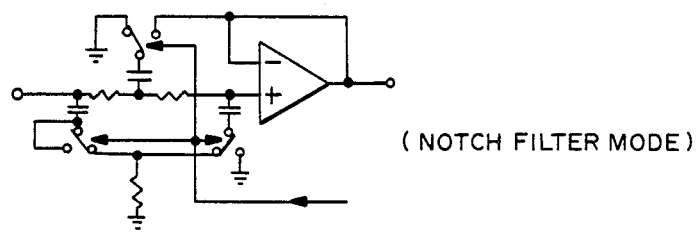
( NOTCH FILTER MODE )
FIG.—18A
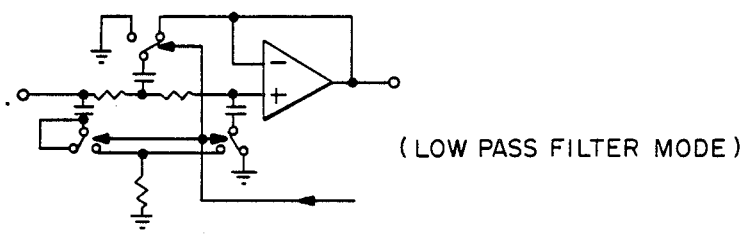
( LOW PASS FILTER MODE )
FIG.—18B
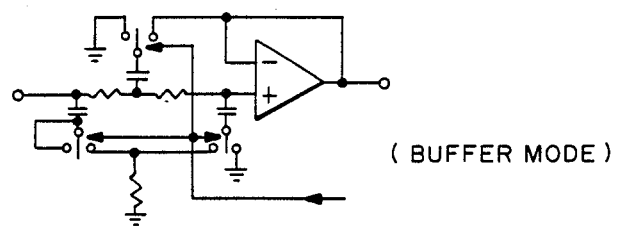
( BUFFER MODE )
FIG.—18C

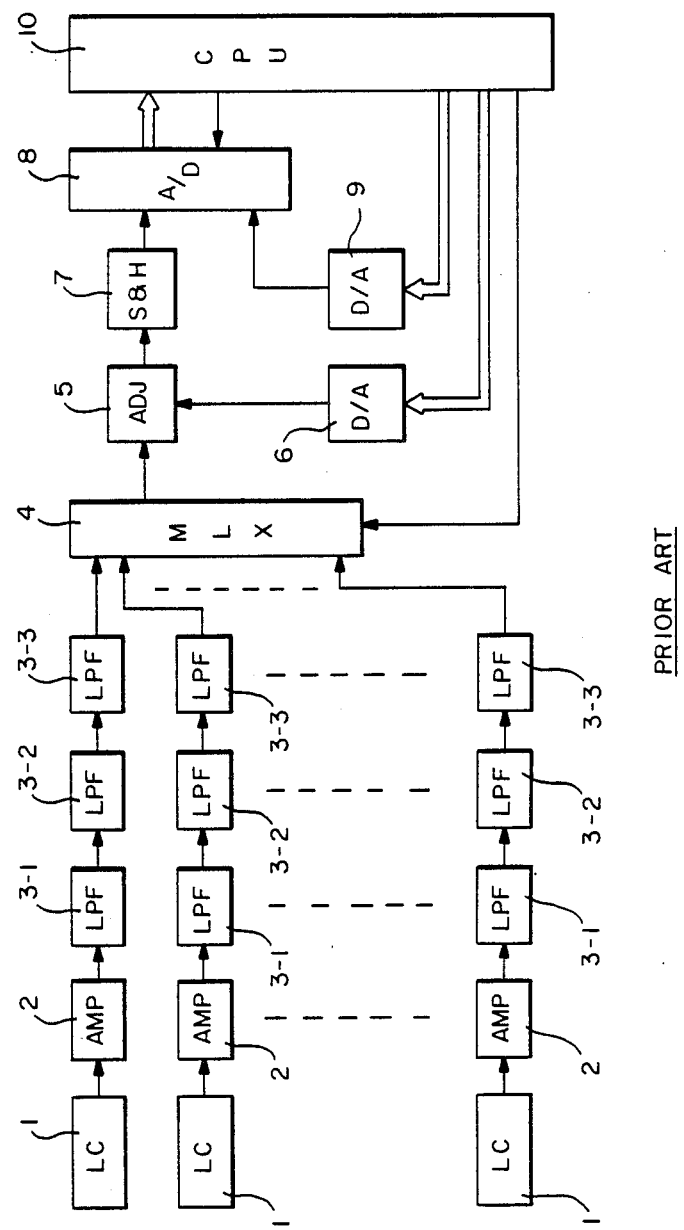
FIG.—19 PRIOR ART

SIGNAL PROCESSING CIRCUIT AND WEIGHING APPARATUS INCORPORATING SAME

BACKGROUND OF THE INVENTION

This invention relates to a signal processing circuit for an electronic weighing apparatus which not only amplifies analog weight signals but also efficiently attenuates the noise in these signals caused by mechanical vibrations, and more particularly to such a signal processing circuit with an extremely small delay in response due to its filters. This invention further relates to a weighing apparatus incorporating such a signal processing circuit.

Weighing is often effected electronically nowadays rather than mechanically. An electronic weighing apparatus typically uses a load cell of a known kind affixed on one side to the main frame of the apparatus and on the other side through a bracket to a weigh hopper with a gate. Combinational weighing systems disclosed in U.S. Pat. No. 4,398,612 and U.S. patent application Ser. No. 762,722 filed Aug. 5, 1985 and assigned to the present assignee are examples in which use is made of such weighing apparatus with load cells. Such a load cell is adapted to output an analog signal indicative of the value of the gravitational force on the cell. A circuit for processing such signals in the case of a combinational weighing system with a plurality of article batch handling units is illustrated in FIG. 19 wherein weighing devices 1 such as load cells attached to weigh hoppers (not shown) output signals to associated amplifier circuits 2. Behind each of these amplifier circuits 2 is a set of three low pass filters 3-1, 3-2 and 3-3 for attenuating noise in inputted signals. Numeral 4 indicates a multiplexer for selectively outputting the weight signals from the individual article batch handling units; numeral 5 indicates a zero-point adjustment circuit for subtracting from the weight signals the voltage corresponding to the initial load such as the weight of the unloaded hopper; numeral 6 indicates a device for controlling the level of adjustment by the zero-point adjustment circuit 5; numeral 7 indicates a sample-and-hold circuit of a known kind; numeral 8 indicates an analog-to-digital converter; numeral 9 indicates a device for controlling a reference voltage for the analog-to-digital converter 8 for each weighing device in order to keep its span at a predetermined level; and numeral 10 indicates a computer which performs arithmetic operations for combinations of the weight values obtained from the weighing devices and selects a combination on the basis of a predetermined criterion in view of a given target weight value. Weigh hoppers associated with the combination thus selected are discharged in response to a signal outputted from this computer.

Since the major features of electronic weighing and, in particular, of combinational weighing are great accuracy and high throughput, a signal control circuit therefor must be correspondingly efficient. A load cell typically forms an oscillating system and continues to oscillate, outputting a waveform as shown in FIG. 6(A) wherein $t_1$ represents a period in which small oscillations caused by the vibrations of the supporting frame are outputted. When the gate of the associated weigh hopper is mechanically operated by an external force, the load cell reacts as shown in the period $t_2$. When the weigh hopper is released from the influence of external forces, the oscillations in the outputted signal are attenuated gradually as shown in the period $t_3$. In summary, FIG. 6(A) may be interpreted as representing a typical signal waveform when a loaded weigh hopper is discharged and immediately reloaded.

If a weight signal containing noise from various sources as shown in FIG. 6(A) is passed through a series of appropriately chosen low pass filters 3-1, 3-2 and 3-3 as shown in FIG. 16, a waveform depicted in FIG. 6(B) may be obtained with high-frequency components attenuated or effectively removed. A comparison between FIGS. 6(A) and 6(B) shows that the signal which passed through the low pass filters takes a fairly long time to become stable. In other words, effects of a new article batch dropped into a weigh hopper remain for a long time and hence an analog signal indicative of, or proportional to the true weight value does not become available for a long time.

In another aspect of the technology of electronic weighing, there is the well known problem of drifts in output signals due to variations, for example, in the source voltage and tempeature. Since such drifts inevitably cause errors in the computed final weight values, so-called zero-point adjustments must be performed frequently, but the zero-point adjustment of a weighing apparatus can generally be performed only when the associated weigh hopper is empty. When a combinational weighing system is in operation, however, periods during which a weigh hopper is empty are extremely short in duration and a stable zero-point is generally not obtainable in such a short period. Moreover, span adjustments of weighing apparatus must also be performed in order to improve the accuracy of measured values. Since it is usually necessary to place a standard weight in a weighing device, span adjustment could be effected only at times of periodic inspection. In still another aspect, self-check circuits have been considered for checking errors in a signal processing circuit so as to eliminate errors in measurements, but such self-checking operations must also be completed quickly between consecutive cycles of weighing and combinational computations.

SUMMARY OF THE INVENTION

It is therefore an object of the present invention to provide an improved signal processing circuit for a weighing device by reducing the delay in response and without adversely affecting the functions of conventional low pass filters.

It is another object of the present invention to provide a signal processing circuit for a weighing device which improves the weighing efficiency.

It is still another object of the present invention to provide a signal processing circuit for a weighing device which speeds up the self-checking operations.

It is a further object of the present invention to provide a weighing apparatus which allows instant drift corrections whether or not it is loaded with articles to be weighed.

It is a still further object of the present invention to provide a weighing apparatus which allows span adjustments even during its operation so as to more effectively eliminate errors in measurements caused by an incorrect span value.

The above and other objects of the present invention are achieved by providing a signal processing circuit which comprises not only an amplifier for amplifying a weight signal outputted from a weighing device such as a load cell but also an active filter which can be made to function selectably both as a filter and as a buffer. A switching means is also provided for selecting the function of the active filter according to a predetermined timing schedule such that the active filter will function as a buffer when articles to be weighed are received by or discharged from a weigh hopper attached to the load cell. Signal processing circuits of this invention can be incorporated in many types of electronic weighing apparatus including combinational weighing systems. If a self-check circuit of a known kind is included, drift corrections, zero-point adjustments and span adjustments can be effected quickly between consecutive cycles of combinational weighing. If a notch filter for attenuating the characteristic oscillations of the weighing device is included, attenuation of noise can be effected even more efficiently.

DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 8 is a circuit diagram of another operational amplifier for the circuit of FIG. 7, FIG. 9 is a circuit diagram of still another operational amplifier for the circuit of FIG. 7, FIG. 13 is a circuit diagram of another signal processing circuit according to the present invention comprising a notch filter and low pass filters, FIG. 14 is a block diagram of a combinational weighing system incorporating circuits shown in FIG. 13, FIGS. 18(A), 18(B) and 18(C) are circuit diagrams of a notch filter which can be selectably made to function as a buffer, as a notch filter and as a low pass filter, and FIG. 19 is a block diagram of a signal processing circuit of a prior art combinational weighing system with a plurality of article batch handling units.

DETAILED DESCRIPTION OF THE INVENTION

Figure 1:
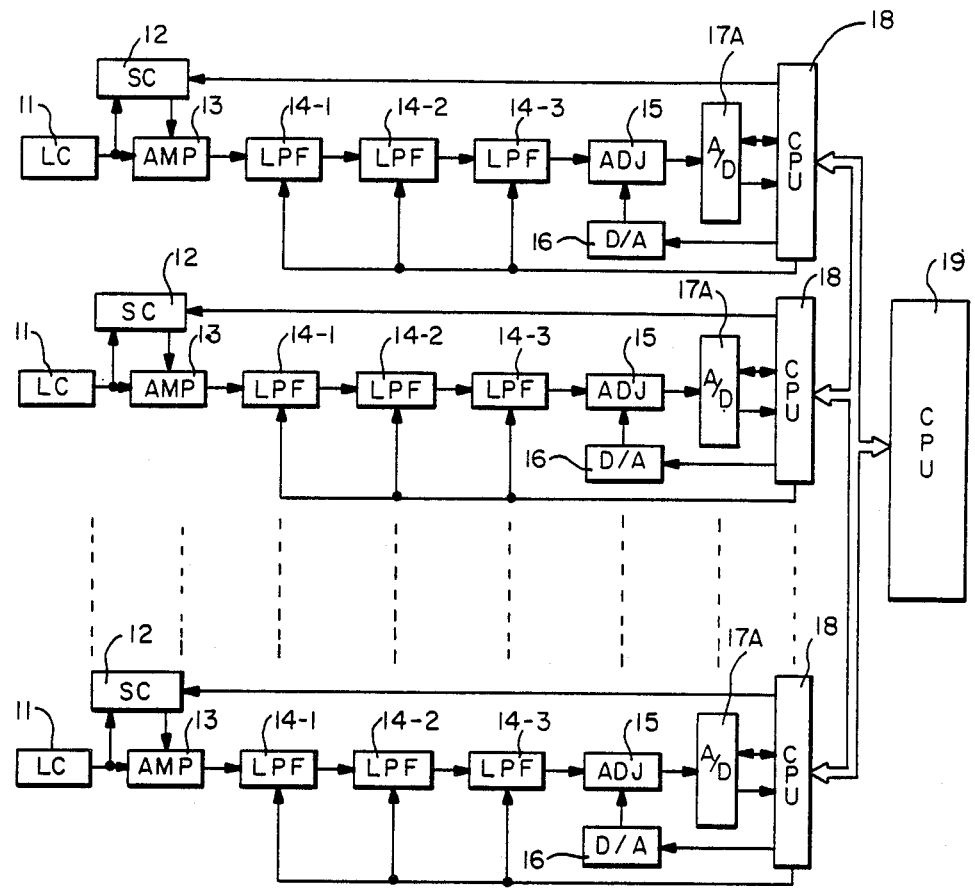
FIG. 1 is a block diagram of a combinational weighing system incorporating signal processing circuits embodying the present invention.
Figure 2:
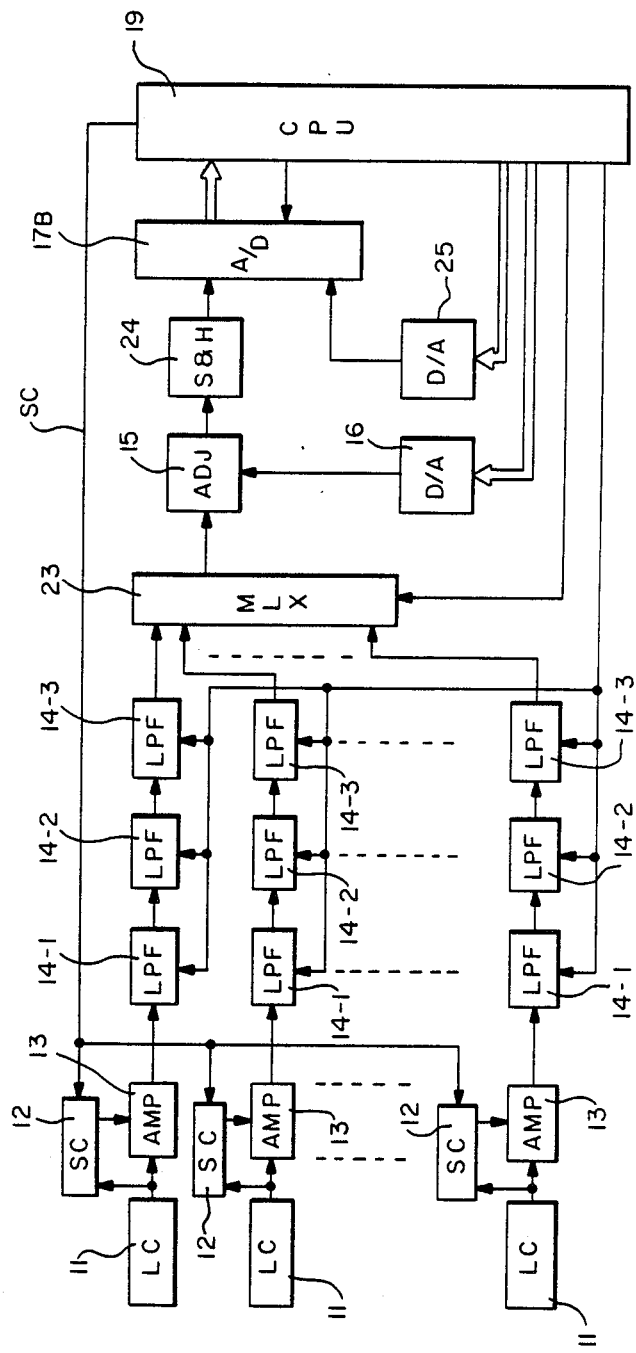
FIG. 2 is a block diagram of a combinational weighing system of another type incorporating signal processing circuits of this invention.

Combinational weighing systems of two different types incorporating signal processing circuits according to a first embodiment of the present invention are illustrated by way of block diagrams in FIGS. 1 and 2, in which corresponding components are indicated by the same numerals for convenience. The basic principles of combinational weighing has long been known. A combinational weighing system, as shown in FIGS. 1 and 2, includes a number (typically 10 to 14) of article batch handling units arranged either in a circular formation around an article dispersing table or in a linear array. Articles to be weighed are typically transported by a conveyor belt and dropped into an article feeding unit from which article batches are delivered to the individual article batch handling units. Each article batch handling unit typically includes a pool hopper which serves to receive an article batch and discharge it into a weigh hopper belonging to the same article batch handling unit. The weigh hopper is connected to a weighing device 11 such as a load cell of a known type and serves to momentarily hold the article batch received from the pool hopper and discharge it in response to a signal. Each weighing device 11 outputs an analog weight value signal indicative of the weighed value measured thereby. The weight value signal is inputted to self-check circuit 12 and an operational amplifier circuit 13. The operational amplifier circuit 13 serves to add and amplify the output signal from the self-check circuit 12 and the weight value signal from the weighing device 11. The output end of the operational amplifier circuit 13 is connected to an active filter 14 which consists of three low pass filters 14-1, 14-2 and 14-3 connected in series and serves to perform selectably a filtering function or a buffering function as will be explained in detail below.

In the type of combinational weighing system illustrated in FIG. 1, the output from the active filter 14 is inputted to a zero-point adjustment circuit 15 belonging to the same article batch handling unit for subtracting the initial (zero load) weight value of the associated weigh hopper. Numeral 16 indicates a digital-to-analog converter for controlling the level of zero-point adjustment to be explained below. The output from the zero-point adjustment circuit 15 is inputted through an analog-to-digital converter 17A to a weight-monitoring computer 18 associated with the same article batch handling unit. Each weight-monitoring computer 18 is connected to a main computer 19 which controls the operation of the entire system including the performance of combinational computations. Various input and output devices such as a keyboard, a printer and a display means as well as a packaging unit to be used in combination with the system and driving control computers for controlling the opening and closing of the hopper gates are typically connected to this main computer 19, but they are not shown in FIGS. 1 and 2 in order not to overly complicate the diagrams. In the type of combinational weighing system illustrated in FIG. 2, the outputs from the active filters 14 of all article batch handling units are sequentially transmitted through a multiplexer 23 to a single zero-point adjustment circuit 15. The output from this zero-point adjustment circuit is inputted through a sample-and-hold circuit 24 of a known kind and an analog-to-digital converter 17B to the main computer 19. In other words, each signal processing circuit is controlled by the associated weight-monitoring computer 18 in the system of FIG. 1 while all signal processing circuits are controlled by the main computer in the system of FIG. 2.

Figure 3:
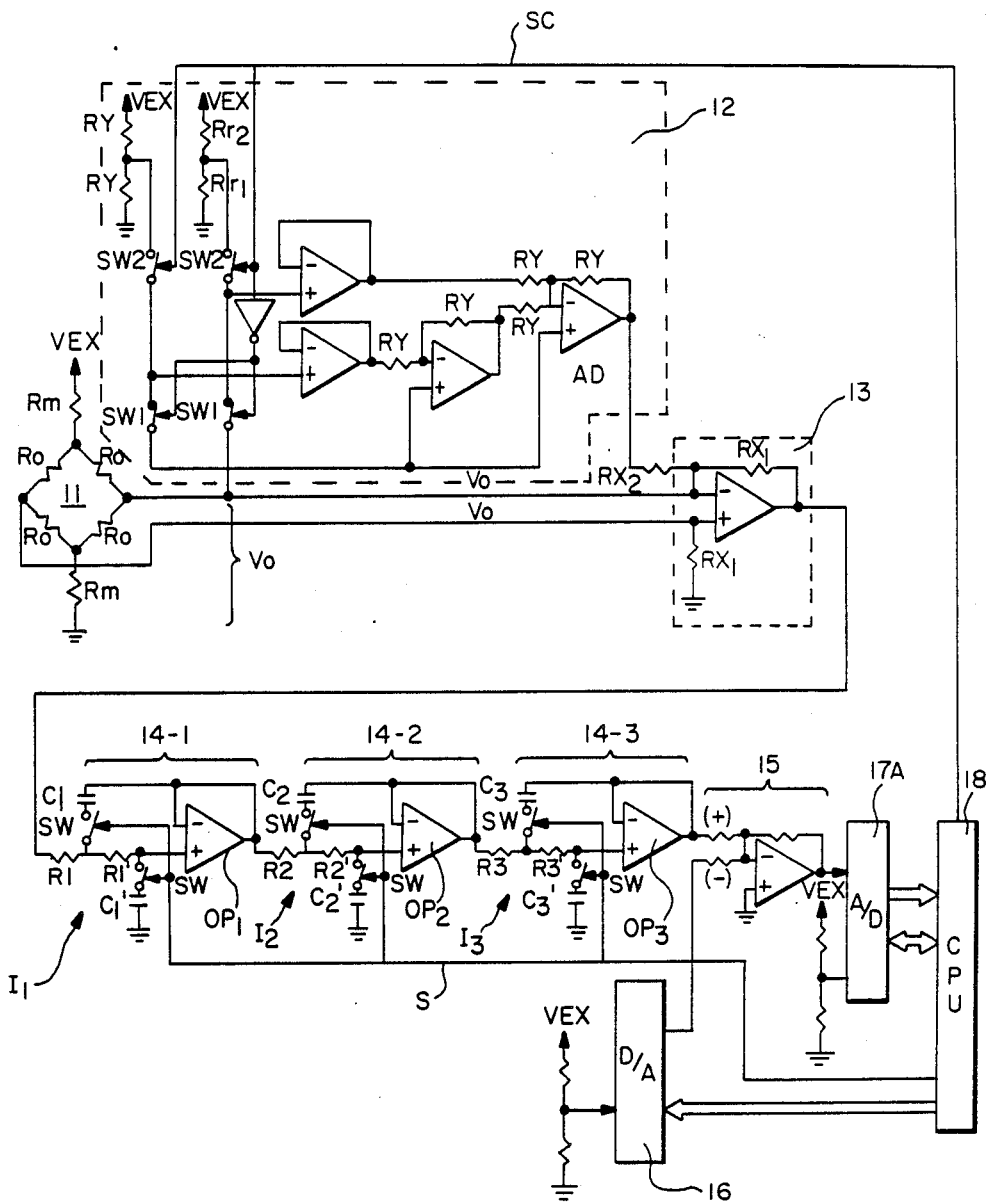
FIG. 3 is a circuit diagram of a signal processing circuit shown in FIGS. 1 and 2.

FIG. 3 is an example of circuit diagram for the aforementioned self-check circuit 12, amplifier circuit 13, active filter 14, etc. The self-check circuit 12 is adapted to function selectably either in a measurement mode or in a self-check mode. In the measurement mode, a low-level self-check signal SC is inputted from the computer 18 so as to close switches SW1 and to open switches SW2. In this mode, therefore, a voltage $V_O$ which is equal to the voltage inputted to the self-check circuit 12 is outputted from the adder AD. In the self-check mode of operation, the self-check signal SC is at a high level so as to open the switches SW1 and to close the switches SW2. In the self-check mode of operation, therefore, a sum of $V_O$ and a fixed voltage proportional to a standard weight for testing is outputted from the adder AD.

The operational amplifier circuit 13 comprises an operational amplifier which, having the bridge resisters of the load cell 11 as its input resister, serves to add the outputs from the load cell 11 and the self-check circuit 12 at its inverter input terminal. In the measurement mode of operation, therefore, the current addition performed at the inverter input terminal is between the output from the self-check circuit 12 and the output terminal voltage $V_O$ of the load cell 11 which are substantially the same, and differential amplification is effected by the operational amplifier circuit 13 such that only a weight signal proportional to the output from the load cell 11 is outputted from its output terminal. In the self-check mode of operation, the sum of the aforementioned input voltage $V_O$ and a prefixed voltage is outputted from the self-check circuit 12, and the addition between this output voltage and the output terminal voltage of the load cell 11 (the aforementioned input voltage $V_O$) is performed at the inverter input terminal of the operational amplifier circuit 13, followed by differential amplification such that the sum of the weight signal proportional to the output from the load cell 11 and the voltage corresponding to the standard weight generated by the self-check circuit 12 and amplified by the operational amplifier circuit 13 is outputted.

Each of the low pass filters 14-i (hereinafter i=1, 2 and/or 3) comprises as shown in FIG. 3 a buffer amplifier (voltage follower) OPi, an RC integrater circuit $I_i$ with its non-inverter input terminal connected to two input resisters $R_i$ and $R'_i$ in series, a capacitor $C_i$ inserted between the mid-point of the two resisters $R_i$ and $R'_i$ and the inverter input terminal of the aforementioned buffer amplifier OPi, a switch SW which opens and closes the connection between the aforementioned mid-point between the two resisters $R_i$ and $R'_i$ and the aforementioned capacitor $C_i$ and another switch SW which opens and closes the connection between the aforementioned non-inverter input terminal and the capacitor $C'_i$ of the aforementioned RC integrater $I_i$. The resisters $R_i$ and the capacitors $C_i$ and $C'_i$ are so selected that the first low pass filter 14-1 will have a quick response and steep cutoff frequency characteristics, that the second low pass filter 14-2 will have a slow response and gradual cutoff frequency characteristics, and that the third low pass filter 14-3 will have intermediate characteristics. The switches SW are adapted to be controlled by a signal S outputted from the corresponding weight-monitoring computer 18 or by the main computer 19 such that they will be closed when the signal S is at the high level and the low pass filters 14-i function as filters but that they will be open when the signal S is at the low level and the low pass filters 14-i function as a three-stage buffer (voltage follower).

The signal which is outputted from the active filter 14 is inputted through a zero-point adjustment circuit 15 to an analog-to-digital converter 17A of a double integrater type as shown in FIG. 3 in the case of a system shown in FIG. 1. In the case of a system of the type shown in FIG. 2, the output from the active filter 14 is inputted to an analog-to-digital converter 17B of a successive comparison type through a multiplexer 23, a zero-point adjustment circuit 15 and a sample-and-hold circuit 24 for all article batch handling units.

The zero-point adjustment circuit 15 comprises an operational amplifier and the currents outputted from the third low pass filter 14-3 and the digital-to-analog converter 16 for controlling the zero-adjustment level are added at its inverter input terminal. The analog-to-digital converter 17A of the double integrater type shown in FIGS. 1 and 3 is so structured that its integration time can be freely changed by a soft-timer of the weight-monitoring computer 18 and span adjustments of weighing devices are effected by adjusting its integration time by the computer 18. In the system of the type shown in FIG. 2, span adjustments of individual weighing devices are effected by adjusting the reference voltage of the analog-to-digital converter 17B by a digital-to-analog converter 25 for span adjustment.

As already stated briefly above, each weight-monitoring computer 18 of FIG. 1 is programmed not only to read the outputs from the associated analog-to-digital converter 17A at a prefixed frequency and to determine whether the corresponding weighing device is loaded or not and whether it has stabilized or not, but also to perform zero-point and span adjustments in response to a command from the main computer 19. The main computer 19 of FIG. 2, on the other hand, is programmed not only to read the weight data from the individual weighing devices but also to perform zero-point and span adjustments, combinational computation and control of mechanisms for driving the hoppers.

Figure 4:
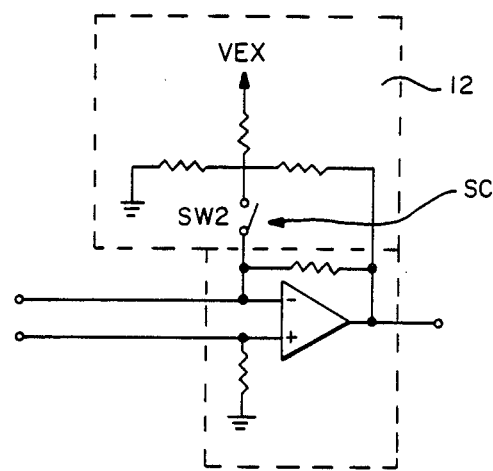
FIG. 4 is a circuit diagram of a self-check circuit according to another embodiment of the present invention.
Figure 5:
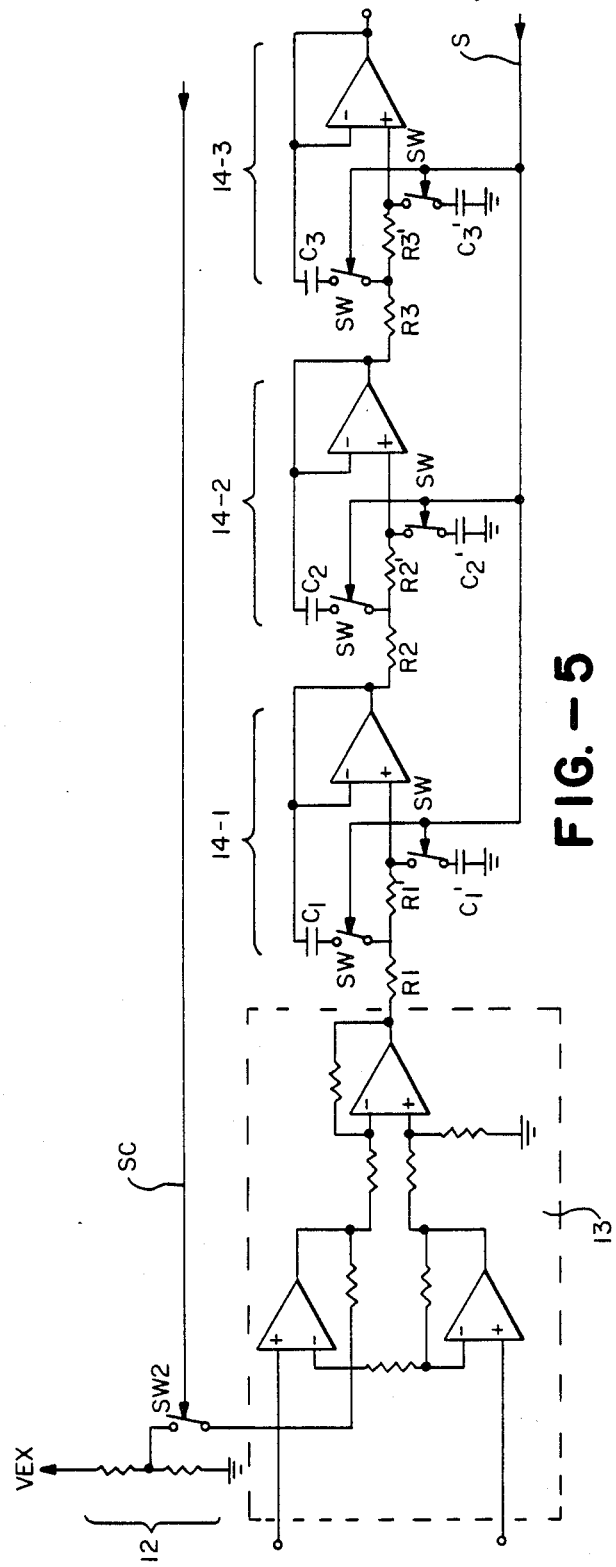
FIG. 5 is a circuit diagram of an amplifier circuit according to another embodiment of the present invention.

FIG. 3 is intended to be interpreted as showing only one example of the circuit structure embodying the present invention. The self-check circuit 12 of FIG. 3 may be replaced by a simple circuit shown in FIG. 4 and the amplifier circuit 13 of FIG. 3 may be replaced by a differential amplifier of a high input impedance type shown in FIG. 5.

Operation of the signal processing circuit described above by way of FIGS. 1, 2 and 3 will be explained next in detail. When article batches to be weighed are thrown into the weigh hoppers, the control signal S from each weight-monitoring computer 18 or the main computer 19 is maintained at a high level such that the switchs SW in the active filter 14 are closed.

Thus, each weighing device 11 associated with a weigh hopper which has just received an article batch outputs a weight signal indicative of the sum of the initial weight of the hopper and the weight of the received article batch. This weight signal is inputted to the active filter 14 after amplifier by the operational amplifier circuit 13, and its noise components caused by the vibrations of the weigh hopper, etc. are attenuated. The signal is then inputted, either directly or through a multiplexer 23, to the zero-point adjustment circuit 15 where a weight signal corresponding to the aforementioned initial weight is subtracted. The output from the zero-point adjustment circuit 15, which is of a voltage indicative of the net weight of the article batch of interest, is converted into a digital value by the analog-to-digital converter 17A or 17B and transmitted, either through the associated weight-monitoring computer 18 or directly, to the main computer 19 which carries out combinational computations on the basis of these weight data. When a certain combination is selected according to a predetermined criterion, the main computer 19 outputs driving signals, either directly or through driver control computers belonging to the individual article batch handling units, to cause the selected weigh hoppers to discharge their contents. In the mean time, a low-level control signal S is outputted from the computer 18 or 19 to the active filter 14 either immediately before or immediately after the aforementioned driving signals are transmitted to the article batch handling units such that all switches SW of the filters 14 are opened together immediately before the weigh hopper gates are opened. The filters 14 are thereby switched to function as buffers and the voltages between the terminals of the capacitors $C_i$ and $C'_i$ are maintained at the values before the weigh hopper gates were opened and the article batches were discharged.

Next, the low-level control signal S is switched to a high level when the weigh hopper gates are closed and new article batches are dropped thereinto from the corresponding pool hoppers thereabove or when the reloading of these weigh hoppers has been completed. This causes all the switches SW to close together and the filters 14-i begin to function as filters again. At this moment, however, the terminals of the capacitors $C_i$ and $C'_i$ are all maintained at the voltage levels before the weigh hoppers were opened and their article batches were discharged. Thus, the voltage changes in the capacitors $C_i$ and $C'_i$ are extremely small when the circuits are commanded to function as filters and this has the desirable effect of significantly reducing the response time required to stabilize the outputs. In other words, the interval between times when article batches begin to be loaded to weigh hoppers and when weight data are read can be shortened and the speed of measurement is improved correspondingly.

The combinational weighing system is so programmed that self-check of each analog signal processing system from the operational amplifier circuit 13 to the analog-to-digital converter 17A or 17B is carried out at an appropriate interval. When a time for self-check arrives, one of the weigh hoppers is selected for self-check from the combination which has just been selected to discharge article batches and the pool hopper corresponding to the weigh hopper thus selected is prohibited from discharging, or supplying a new article batch into this selected weigh hopper.

The control signal S is then switched from the low level to a high level as described above in the case of the measurment mode when the gates of the remaining weigh hoppers (other than the selected one) are closed to receive new article batches from the corresponding pool hoppers above or when the reloading of the new article batches had been completed. In synchronism therewith, or nearly in synchronism therewith, a high-level self-check signal SC is transmitted from the weight-monitoring computer 18 or the main computer 19 to the self-check circuit 12 of the article batch handling unit selected for self-check. This causes the switches SW1 to open and the switches SW2 to close such that a specified voltage is outputted from the self-check circuit 12 and is added to the output voltage $V_O$ from the load cell 11 at the inverter input terminal of the operational amplifier circuit 13. As a result, the output from the operational amplifier circuit 13 is the sum of a voltage corresponding to the initial weight of the hopper and a voltage corresponding to the standard weight. When this passes through the active filter 14, the zero-point adjustment circuit 15, etc., it becomes adjusted to the voltage corresponding to the standard weight, converted into a digital value by the analog-to-digital converter 17A or 17B and received by the weight-monitoring computer 18 or the main computer 19. The inputted value is compared with a standard value corresponding to the standard weight and, if this difference is within a predetermined allowable limit, the analog signal processing system is considered normal. If the difference is outside this allowable limit, on the other hand, the span is considered incorrect and a recovery procedure is undertaken immediately. In a system of the type with a double-integrater type analog-to-digital converter 17A, for example, the weight-monitoring computer 18 adjusts the integration time such that the output from the analog-to-digital converter 17A in the self-check mode will become the same as the aforementioned reference value. In a system using an analog-to-digital converter 17B of a successive comparison type, the digital-to-analog converter 25 is used to adjust the reference voltage such that the output from the analog-to-digital converter 17B and the aformentioned reference value will become equal.

Self-check or a combination of self-check and span adjustment is completed before the beginning of the next cycle when new article batches are thrown into weigh hoppers and the self-check signal SC is immediately switched to a low level, the self-check circuit 12 becoming switched for a measurement mode of operation. Since the switching controls on the active filter 14 are performed also in the case of a self-check, the response stabilizes equally quickly when a test voltage is outputted from the self-check circuit 12. This means that self-check can be effected on a selected weighing device between normal cycles of weighing without affecting its speed adversely.

The description given above of this embodiment of the present invention is not intended to limit the scope of this invention. For example, the active filters need not be of a three-stage structure. The number of stages may be one, two or four. With respect to the active filters, many different circuit structures may be considered according to desired characteristics. Moreover, signal processing circuits of the present invention may be incorporated not only in a combinational weighing system but also in an ordinary automatic weighing system.

Figure 6:
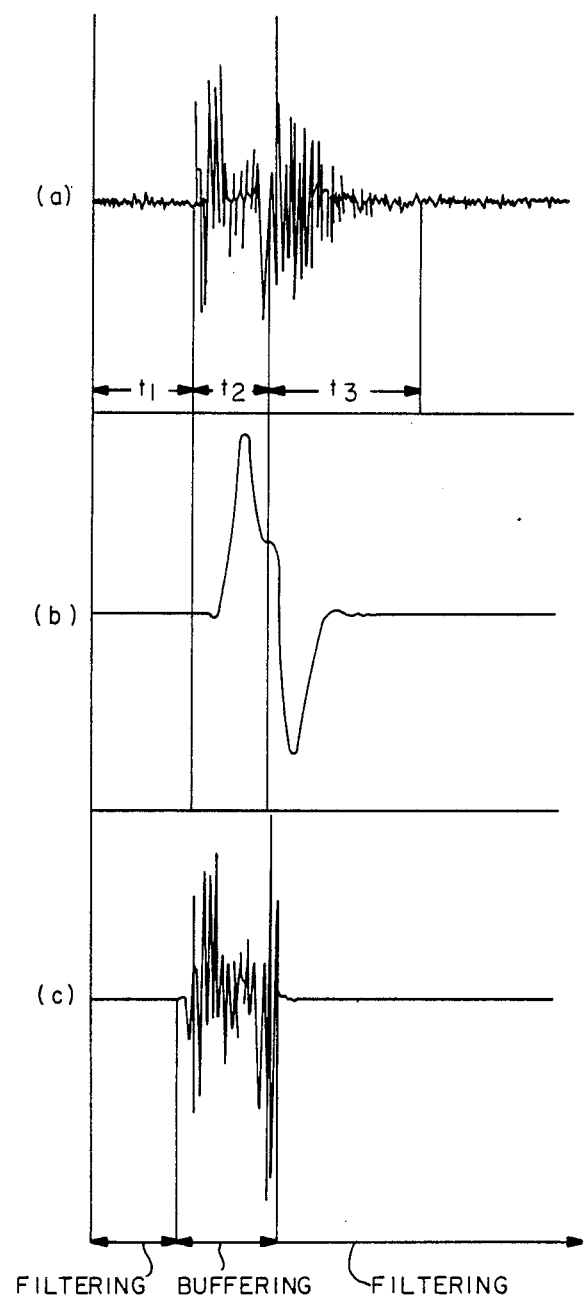
FIGS. 6(A), 6(B) and 6(C) are waveform diagrams showing the effects of the signal processing circuit shown in FIG. 3.

To summarize, the present invention is addressed to the problem of delay in response generated most significantly by the active filters in an analog signal processing system. The low pass filter means according to the present invention, therefore, is provided with switching means whereby the filter means can be made to function selectably either as a filter or as a buffer. Immediately before weigh hopper gates are opened, the filters are made to function as buffers and the capacitors in the filters are isolated from the sudden voltage variations which take place when the gates are suddenly opened or closed. When the gates are closed and next article batches are received, the filters are switched to function as filters such that the output from load cells, when voltage variations are small, are attenuated by these filters. This serves to eliminate the delays in response caused by the sudden voltage variations when gates are opened or closed. Moreover, changes in voltages between terminals of these capacitors are also reduced. FIG. 6(c) is a waveform diagram for an output signal from the active filter, showing the waveform quickly stabilizing after the switching of the filters' functions at time $t_O$.

Next, there will be described by way of the circuit diagram in FIG. 7 a signal processing circuit according to another embodiment of the present invention addressed to the problem of drifts in output signals which are inevitably caused by variations in the source voltage, temperature, etc. In electronic weighing systems, such drifts cause errors in measured weight values and a common procedure of preventing such errors has been to store the output value from an analog-to-digital converter under a no-load condition as its zero-point and to calculate a net weight by retrieving this stored zero point value whenever a weight of an object is to be measured. Such measurements of a zero point are performed fairly frequently in order to keep updating the zero point value. With a combinational weighing system, however, each weigh hopper remains empty only for very brief periods of time. Moreover, since the zero point is not stabilized within such a brief period of time, it is necessary, for example, as explained above in connection with the first embodiment of the present invention, to prevent for one cycle one of the discharged weigh hoppers from becoming refilled. An obvious disadvantage of this method is that one of the weigh hoppers is prevented from participating in the following combinational computations and hence this can affect the accuracy of combinational weighing adversely. It is desirable, therefore, to provide a signal processing circuit which allows instantaneous drift and span adjustments to be performed even while measurements of weight values are being taken with all weigh hoppers participating in combinational computations.

Figure 7:
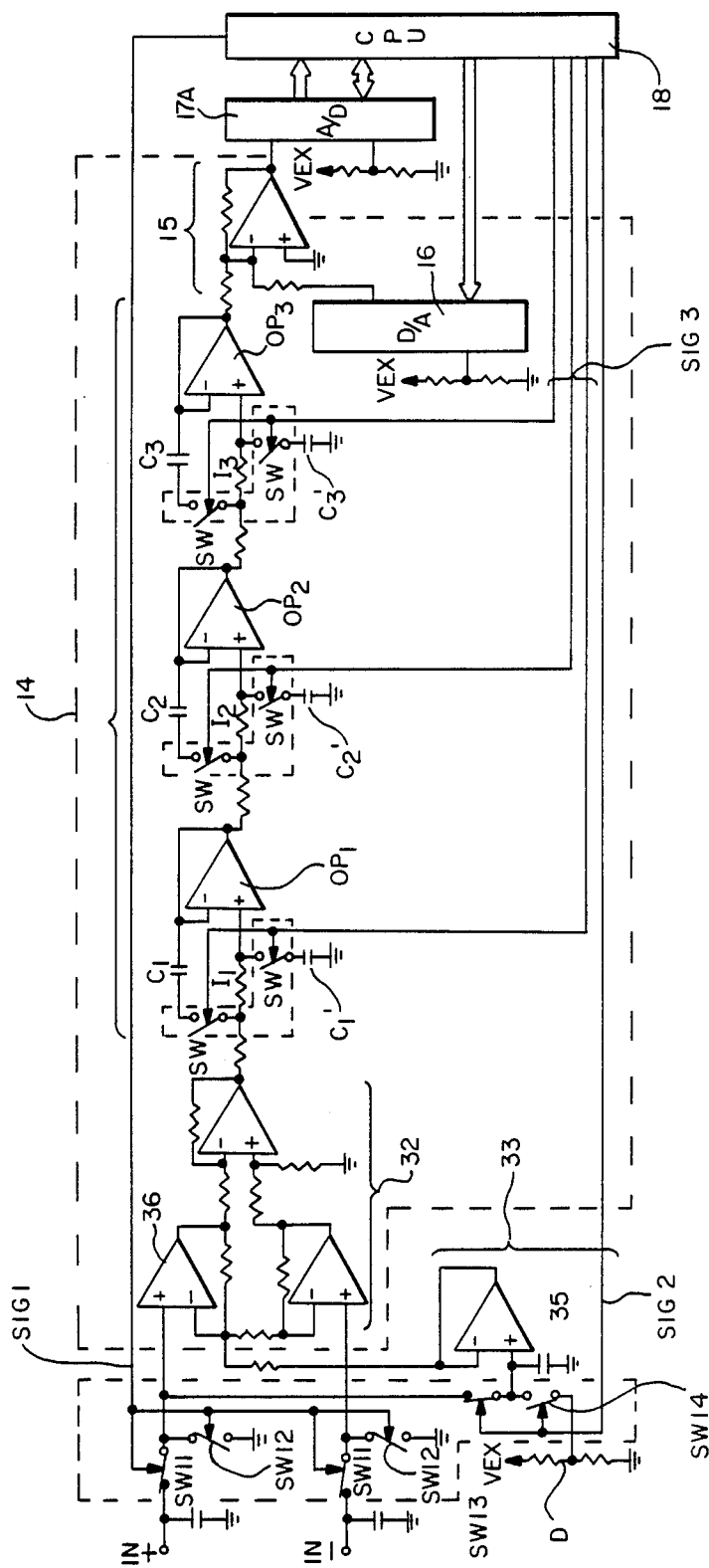
FIG. 7 is a circuit diagram of a signal processing circuit according to another embodiment of the present invention.

Reference being made to FIG. 7, there is shown an example of signal processing circuit which may be incorporated in combinational weighing systems of FIGS. 1 and 2 with only minor modifications. Parts corresponding to those in FIG. 3 are therefore indicated by the same numerals. For example, numeral 14 therein again indicates an active filter having three low pass filters 14-i connected in series. Unlike the circuits shown in FIGS. 1 and 2, however, the output signal from each weighing device 11 (not shown in FIG. 7) is inputted through a first switching means 31 to an operational amplifier circuit 32 and a reference voltage outputting circuit 33 and the output from the reference voltage outputting circuit 33 is also inputted to the operational amplifier circuit 32. The output from the operational amplifier circuit 32 is inputted to the active filter 14. As will be explained in detail below, the first switching means 31 is adapted to function selectably in a measurement mode or an adjustment mode of operation and is connected on the input side of an operational amplifier circuit 33. In the measurement mode of operation, the first switching means outputs the output signal from the weighing device 11 and in the adjustment mode of operation, it outputs either a reference signal for detecting the magnitude of offset or a reference signal for carrying out span adjustment. As shown in FIG. 7, the first switching means 31 includes normally closed switches SW11 and SW13 and normally open switches SW12 and SW14. The switches SW11 are respectively inserted between an output terminal of the weighing device 11 and the input terminal of the operational amplifier circuit 33. The switch SW13 is inserted through a buffer amplifier 35 between the two input terminals of one of non-inverter amplifiers 36 in the operational amplifier circuit 32. The switches SW12 are respectively inserted between the ground and the input terminals of the aforementioned operational amplifier circuit 32. The switch SW14 is inserted between the voltage dividing point of a voltage dividing circuit D for outputting a reference voltage for span check and the inverter terminal of the aforementioned non-inverter amplifier 36.

In the measurement mode of operation, control signals Sig1 and Sig2 are outputted from the weight-monitoring computer 18 to keep the normally closed switches SW11 and SW13 in closed conditions and the normally open switches SW12 and SW14 in open conditions such that the output from the associated weighing device 11 is inputted to the operational amplifier circuit 32 and to the buffer amplifier 35. At this time, the output voltage from the buffer amplifier 35 becomes equal to its input voltage and, since the voltages at both input terminals of the non-inverter amplifier 36 become equal due to imaginary short-circuiting, there is substantially no current addition at the inverter terminal of the non-inverter amplifier 36. Thus, only the output from the weighing device 11 is amplified.

In the drift adjustment mode of operation, control signals Sig1 and Sig2 from the weight-monitoring computer 18 cause the normally closed switches SW11 to open and the switches SW12 and SW13 to close, setting the input terminals of the operational amplifier circuit 32 and the input terminals of the buffer amplifier 35 at a ground level. As a result, an offset voltage is outputted from the signal processing circuit and the computer 18 can perform drift adjustment by monitoring its temporal variations as will be explained below.

In the span adjustment mode of operation, measurement of offset voltage is taken first as explained above and then the switches SW11 and SW13 are opened while the switches SW12 and SW14 are closed. As a result, a reference voltage for span check is outputted from the buffer amplifier 35 and this is added by the operational amplifier circuit 32 such that a reference voltage of set level is outputted from the signal processing circuit. The computer 18 then reads the output from the analog-to-digital converter 17A and calculates the span from the difference between this output and the aforementioned offset voltage. Span adjustment is effected as described above such that the calculated span will match a predetermined value. A method of using an analog-to-digital converter for span adjustment as outlined above is explained more in detail in U.S. Pat. No. 4,545,445 which is assigned to the present assignee and is herein incorporated by reference.

The active filter 14 was already described above in connection with FIG. 3. The control signal indicated by letter S in FIG. 3 is indicated here by three signal lines Sig3 to show that control signals to individual low pass filters 14-i may be transmitted independently. The two switches SW in each low pass filter 14-i will be referred to as a second switching means. As explained above in connection with FIG. 3, the active filter 14 functions as a buffer (with three stages) if the switches SW (or the second switching means) are opened and as a filter if the switches SW are closed.

The individual circuits in FIG. 7 need not be structured exactly as shown therein. The operational amplifier circuit 32 of FIG. 7 has the property that its offset voltage changes if its input voltage varies. Thus, the input voltage must be approximately the same as the output voltage from the load cell in the measurement mode. In order to obviate this requirement, a portion of FIG. 7 including the circuit 32 may be changed as shown in FIG. 8 or FIG. 9 in which the same numerals as defined above indicate like or corresponding components.

In the circuit shown in FIG. 8, the switch SW01 is closed and the switch SW02 is opened in the measurement mode of operation such that the potential difference between the two output terminals of the load cell 11 (bridge circuit) is calculated, amplified and outputted by the operational amplifier circuit 32. In the drift adjustment mode of operation, on the other hand, the switch SW01 is opened and the switch SW02 is closed such that the input voltage of the operational amplifier circuit 32 becomes nearly the same as the load cell output voltage. Since the two input voltages to the operational amplifier circuit 32 are thus nearly equal to each other, the difference calculated by it becomes zero and its output terminal outputs a drift voltage corresponding to the drift of the operational amplifier circuit 32 in the measurement mode of operation. The circuit shown in FIG. 9 is characterized as having a voltage dividing circuit $D_O$ for obtaining a constant input voltage to the non-inverter terminal of the operational amplifier circuit 32 in the span adjustment mode of operation. In the measurement mode of operation, the switches SW01 and SW13 are opened and the switches SW02 and SW14 are opened such that the operational amplifier circuit 32 operates as explained by way of FIG. 8. In the drift adjustment mode of operation, the switches SW01 and SW14 are opened and the switches SW02 and SW13 are closed such that a voltage ($V_{ex}/2$) nearly equal to the output voltage from the load cell 11 is inputted to the operational amplifier circuit 32. Thus, a drift voltage corresponding to the drift of the operational amplifier circuit 32 in the measurement mode of operation is outputted from its output terminal. In the span adjustment mode of operation, the switches SW01 and SW13 are opened and the switches SW02 and SW14 are closed such that the voltage at the non-inverter terminal of the operational amplifier circuit 32 becomes $V_{EX}/2$ while a voltage given by $R_2 V_{EX}/(R_1+R_2)$ is outputted from the aforementioned voltage dividing circuit D. Where $R_1$ and $R_2$ are the resistances of the resistors therein as indicated in FIG. 9. A constant span-check voltage is outputted from the operational amplifier circuit 32.

The operational amplifier circuit 32 of FIG. 7 with a differential amplifier of high input impedance type may be replaced by a different amplifier circuit shown by numeral 42 of FIG. 8 or numeral 52 of FIG. 9. These amplifier circuits 42 and 52 include an operational amplifier 46 and 56, respectively, both having as input resistor the bridge resistors of the weighing device 11. Numerals 41 and 51, respectively of FIGS. 10 and 11, indicate first switching means according to different embodiments. According to the embodiment shown in FIG. 10, the first switching means 41 includes normally closed switches SW41 inserted between the weighing device 11 and the operational amplifier 46, normally open switch SW42 inserted between the non-inverter terminal of the operational amplifier 46 and the ground, another normally open switch SW42' inserted in the feedback circuit of the operational amplifier 46, and a normally closed switch SW43 and a normally open switch SW44 which are inserted in parallel between the voltage dividing points of a voltage dividing circuit D' adapted to output two kinds of reference voltages and the output terminal of the operational amplifier 46. According to the embodiment shown in FIG. 11, the first switching means 51 includes normally closed switches SW51 inserted between the weighing device 11 and the operational amplifier 56, a normally open switch SW52 inserted between the non-inverter terminal of this operational amplifier 56 and the ground, and a normally open switch SW52' inserted in the feedback circuit of the operational amplifier 56.

Figure 10:
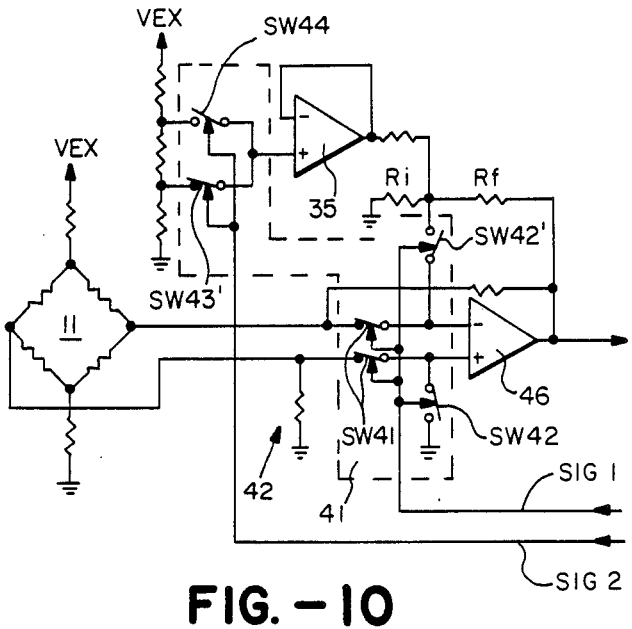
FIG. 10 is a circuit diagram of still another operational amplifier for the circuit of FIG. 7.

Reference being made firstly to the circuit of FIG. 10 in the measurement mode of operation, the switches SW41 and SW43' are closed and the switches SW42, SW42' and SW44 are opened by control signals Sig1 and Sig2 from the computer 18 such that only the output from the weighing device 11 is inputted to the operational amplifier 46. In the drift adjustment mode of operation, the switches SW41 are opened and the switches SW42 and SW42' are closed by the control signal Sig1. Furthermore, the switch SW43' is closed and the switch SW44 is opened by the control signal Sig2 such that the buffer amplifier 35 outputs a bias voltage for maintaining the input level of the analog-to-digital converter 17A somewhat on the positive side. The operation of the circuit of FIG. 10 is similarly explained. In summary, the operational amplifiers 46 and 56 of FIGS. 10 and 11 function each as an inverter amplifier having a set bias voltage as input and the offset voltage generated by it is amplified and outputted. The offset voltage is also simultaneously outputted from the signal processing circuit. The ratio of amplification in this case is set equal to the amplification of the operational amplifier 46 in the measurement mode of operation such that the total offset voltage can be detected equivalently.

In the span adjustment mode of operation, the aforementioned offset is measured first and then the switches SW41 and SW43' of FIG. 10 are opened and the switches SW42, SW42' and SW44 are closed. A reference voltage for span adjustment is thereby outputted from the buffer amplifier 35 and a corresponding reference voltage is outputted from the operational amplifier 46 for span adjustment.

Figure 11:
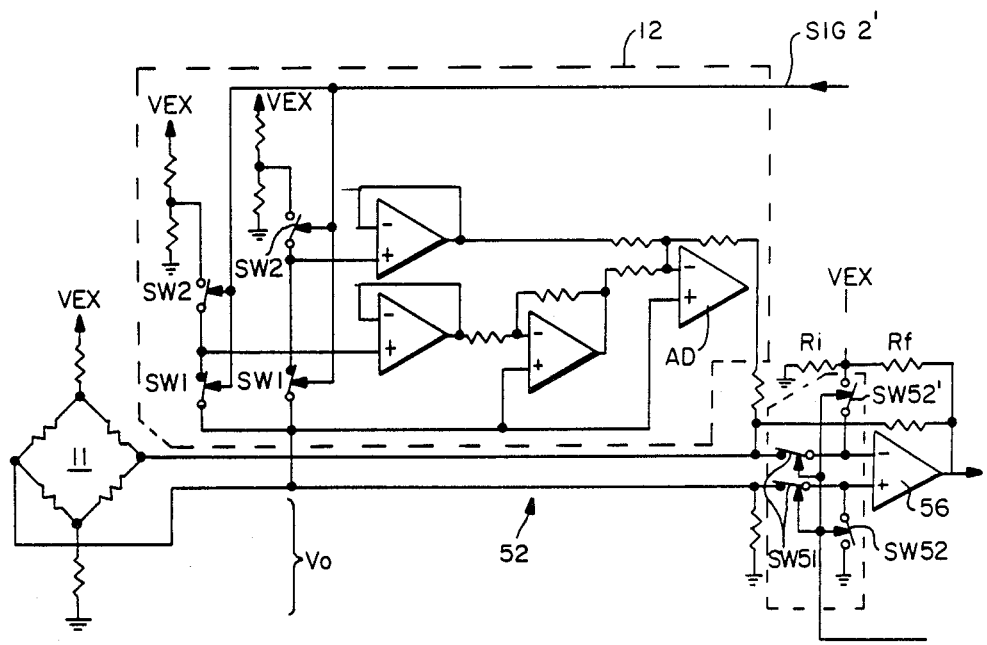
FIG. 11 is a circuit diagram of still another operational amplifier and a self-check circuit according to this invention.

The circuit shown in FIG. 11 is characterized as having a self-check circuit 12 in place of the reference voltage outputting circuit (33 of FIG. 7). The structure and function of this self-check circuit 12 are the same as explained in connection with FIG. 3.

Operation of the signal processing circuit of FIG. 7 is very similar to that of the circuit of FIG. 3 described in detail above. When the zero-point adjustment of a particular weighing device is specified through a data inputting means (not shown), the main computer 19, through the weight-monitoring computer 18 related to the same article batch handling unit, causes the weigh hopper corresponding to the specified weighing device to discharge its article batch and at the same time outputs control signals Sig1, Sig2 and Sig3 to the first switching means 31 and the active filter 14 (or to the second switching means therein) to set the former in the measurement mode of operation and the latter in the filter mode of operation. Then, as explained above, a weight signal indicative of the weight detected by the weighing device of interest is outputted to the computer 18 which operates the digital-to-analog converter 16 to adjust the output from the analog-to-digital converter 17A to a near-zero value on the positive side, storing this value as the zero point. Next, the computer 18 outputs control signals Sig1, Sig2 and Sig3 to set the first switching means 31 in the drift adjustment mode of operation and the active filter 14 (or the second switching means therein) in the buffer mode of operation. The input to the operational amplifier circuit 32 is thereby set at the ground level and the offset voltage of the entire system is outputted without delay, converted into a digital value and stored.

After the initial zero points and offset values are thus determined, if a new offset value is obtained in an adjustment mode of operation between cycles of combinational weighing process in which weigh hoppers are opened and closed, the difference between the newly obtained offset value and the initial value is computed. Since this difference represents the magnitude of the drift which has taken place, drift adjustment is effected by adding or subtracting this difference to or from the previous zero point.

For span adjustment, a standard weight is placed in the weigh hopper of interest after its zero point is adjusted and a span adjustment command is inputted as in the case of zero-point adjustment described above. The computer 18 then outputs control signals Sig1, Sig2 and Sig3 to the first switching means 31 and to the active filter 14 (or the second switching means therein) to set the first switching means 31 in the measurement mode of operation and the active filter 14 in the filter mode of operation, causing a digital value corresponding to the standard weight to be outputted from the analog-to-digital converter 17A. The computer 18 inputs this digital value, obtains the span from the difference between this and the aforementioned zero point and adjusts the span to a desired value by controlling the integration time of the analgo-to-digital converter 17A.

Next, the computer 18 outputs control signals Sig1, Sig2 and Sig3 to the first switching means 31 and the active filter 14 (or the second switching means therein) to set the former in the offset detection mode and the latter in the buffer mode of operation, detecting an offset value from the signal processing circuit. Thereafter, control signals Sig1 and Sig2 are outputted to the first switching means 31 without effecting any change to the active filter 14, thereby switching the first switching means 31 into the span adjustment mode of operation. In this situation, a fixed reference voltage independent of the standard weight is outputted from the operational amplification circuit 32 and is converted into a digital value by the analog-to-digital converter 17A and inputted to the computer 18 without a delay. The computer 18 calculates a span value based on this digital value and the aforementioned offset value when the reference voltage is inputted. This calculated value is then stored as the reference value when there is no error in the span. Thereafter, the operation of the system is resumed, with span adjustment mode of operation repeated as explained above. In summary, since the span check and drift check are both effected through a buffer circuit involving no delay in response, they can be completed instantaneously without disturbing the cyclic operation of combinational weighing.

In the above, signal processing circuits of the second embodiment of the present invention were explained as parts of a combinational weighing system of the type having weight-monitoring computers for the individual article batch handling units in addition to the main computer for controlling the operation of the entire system, or the type illustrated by FIG. 1. These signal processing circuits, however, can be incorporated equally well in the type of combinational weighing systems illustrated by FIG. 2. In such a case, it goes without saying that the functions performed by the weight-monitoring computer 18 in the example explained above must be performed by the main computer 19. In summary, the signal processing circuits of this embodiment can be used in many types of weighing systems.

Figure 12:
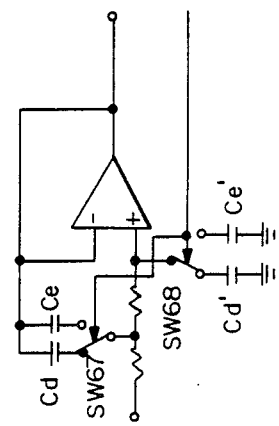
FIG. 12 is a circuit diagram of a low pass filter of which the response characteristics can be switched in two steps, such as between fast and slow.

Since high-frequency noise in a signal sometimes appears as an error when the active filter is set in the buffer mode of operation, it is preferable to insert at an appropriate place in the signal processing circuit a low pass filter of the type shown in FIG. 12. The filter shown by FIG. 12 is characteristic in that its response characteristics can be switched between fast and low by means of switches SW7 and SW8. When the filter is set for the buffer mode of operation, such low pass filter might be set for smaller delay in response such that high frequency components of the signal will be attenuated. When the characteristic frequency of the weighing device is included in the signal, the signal level may cease to be constant when a change is effected from adjustment mode of operation to measurement mode of operation. This can cause fluctuations in the rise times of weight signals when articles to be weighed are dropped in, thus randomizing the stabilization time of measurement.

If the switching between the filter and buffer modes of operation is effected at a fixed timing as described above, however, fluctuations in output voltage value from the weighing devices at the time of such switching may have to be taken into consideration. If this fluctuation is large, variation in voltage amplitude between terminals of the capacitor becomes large and the time required for stabilization becomes longer. When the timing for reading in weight values is determined, therefore, it is necessary to set it an a level of the longest stabilization time and this adversely affects the weighing efficiency.

Figure 15:
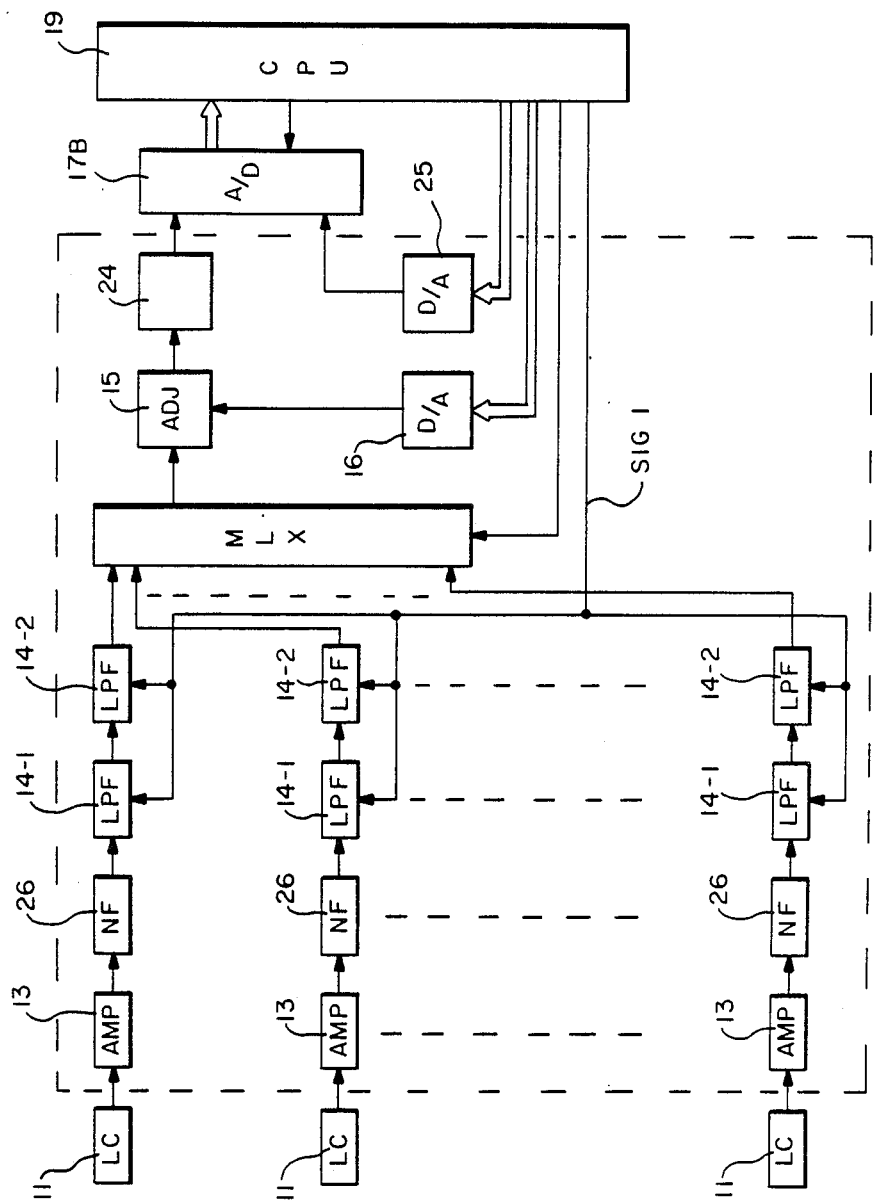
FIG. 15 is a block diagram of another combinational weighing system incorporating circuits shown in FIG. 13, FIGS. 16(A), 16(B) and 16(C) are waveform diagrams showing the effects of the signal processing circuit shown in FIG. 13.

One of the methods to eliminate this problem would be to capture a zero-cross point of an oscillating load cell either mechanically by a level sensor or the like, or electronically from its output and to switch from the buffer mode of operation to the filter mode of operation in accordance with this timing. This method, however, requires a structurally complicated device and the procedure for adjusting the detection timing is also complicated. In short, this method is not very practical. FIG. 13 is a circuit diagram of an active filter which includes in view of the above a notch filter 26 for attenuating the noise caused by the free oscillations of the weighing device. Such an active filter can take the place of active filters shown, for example, in FIGS. 1, 2, 3 and 7, or the control system of a combinational weighing system incorporating such active filters in its signal processing circuits may be as shown in FIGS. 14 and 15 wherein components corresponding to those in FIGS. 1, 2 and 7 are indicated by the same numerals. FIG. 14 is a system of the type shown in FIG. 1, having a weight-monitoring computer 18 for each of its article batch handling unit. FIG. 15 is a system of the type shown in FIG. 2, having a multiplexer to input weight signals from the individual article batch handling units sequentially into the main computer 19 which also performs the functions of weight-monitoring computers 18 of FIG. 14. Structures and functions of the components shown in FIGS. 12 and 13 other than those shown in FIG. 13 were already explained above in connection with FIGS. 1 and 2 and hence will not be explained below.

Reference being made to FIG. 13 in combination with FIGS. 14 and 15, the notch filter 26 is inserted between an amplifier circuit 13 and low pass filters 14-1 and 14-2 connected in series. It includes a twin-T circuit 27 of a well known type having resistors and capacitors and the output end of this twin-T circuit 27 is connected to a buffer amplifier 28 through a parallel RC circuit 29 for impedance matching. Its filter constant is adjusted for the attenuation of the components corresponding to the characteristic oscillation of the weighing device including the associated weigh hopper. Signal noise with large amplitudes is thereby attenuated quickly in the free oscillation period after the weigh hopper gate is released from external forces. Although the frequency of characteristic oscillation of a weighing device varies, depending on the weight of the article batch being carried in the weigh hopper, the weight of the hopper is usually much greater than that of the article batch in the case of a combinational weighing system and fluctuations in the characteristic frequency can be ignored. In other words, notch filters of the type described above are sufficiently adequate in such applications.

Each low pass filter 14-j (hereinbelow j=1 or 2) includes an RC integrator circuit Ij with its output terminal connected to the non-inverter terminal of a buffer amplifier 30. The middle point of resistors Rj of the RC integrated circuit Ij is connected to the inverter terminal of the buffer amplifier 30 through a switch SW7j and a capacitor Cj, and a switch SW7j' is inserted between a capacitor C'j belonging to the RC integrator circuit Ij and the non-inverter terminal of the buffer amplifier 30. Immediately before the weigh hopper gate belonging to the same article batch handling unit is released, a control signal Sig1 is outputted from the computer 18 or 19 to open the switches SW7j and SW7j' such that the low pass filters 14-1 and 14-2 are simultaneously made to function as buffers. The computer 18 or 19 outputs another control signal Sig1 when a new article batch is expected to have been received to close these switches SW7j and SW7j' such that the low pass filters 14-1 and 14-2 are simultaneously made to function as filters. The resistors and capacitors of the low pass filters are so selected that the first low pass filter 14-1 will respond quickly and the cutoff frequency characteristic is steep while the second low pass filter 14-2 will have a slow response and its cutoff frequency characteristic is gently sloped.

The circuit shown in FIG. 13 functions as follows. When articles to be weighed are distributed among the article batch handling units in a well known manner, each weighing device 11 (with reference, for example, to FIGS. 14 and 15) outputs during one cycle of the system's operation a signal which includes components with large amplitudes corresponding to the characteristic oscillation of the weighing device as shown in FIG. 16(a). When this signal is passed through the notch filter 26, these characteristic oscillations are attenuated as shown in FIG. 16(b). The delay in response of the weight signal which is the direct current component is small in the notch filter 26. Only the characteristic oscillation components with large amplitudes are attenuated. During the period T when the weigh hopper gate is open, the low pass filters 14-1 and 14-2 are set to function as buffers. Thus, the signal containing noise is directly outputted through the low pass filters 14-1 and 14-2. When the weight hopper gate is closed and a new article batch has been supplied to it from the associated pool hopper thereabove (at time $t_o$), a control signal Sig1 from the computer 18 or 19 causes the low pass filters 14-1 and 14-2 to start functioning as filters. Thereafter, the components corresponding to the characteristic oscillations which have already been attenuated by the notch filter 26 are further attenuated by the low pass filters 14-1 and 14-2. Thus, the weight signal stabilizes very quickly after the time $t_o$ as shown in FIG. 16(c), converging to the final weight value.

If the combinational weighing system of which signal processing circuits described above are parts is of the form described by FIG. 14, weight signals obtained as explained above are successively sampled at a predetermined frequency inclusive of the period before stability is established. These inputted values are converted into digital values and inputted and stored by the individual weight-monitoring computers 18. In the case of a combinational weighing system of the type shown in FIG. 15, detected weights of the individual weighing devices are successively sampled when the weight signals are considered stabilized, and they are converted into digital values and sequentially inputted to the main computer 19.

Figure 17:
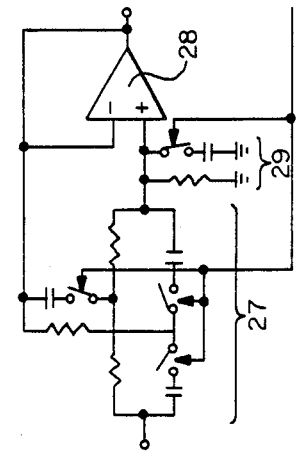
FIG. 17 is a circuit diagram of a notch filter which can be selectably made to function as a buffer and as a filter.

The notch filter 26 of FIG. 13 may be structured as shown in FIG. 17 such that it, too, can be selectably made to function as a buffer or as a filter. With a notch filter of this type, drift corrections and span adjustments described above in connection with the system of FIG. 7 can also be performed. The notch filter of FIG. 17 is intended to be used first as a filter to attenuate the noise components with large amplitudes and then the low pass filters 14-1 and 14-2 are switched from the buffer mode to the filter mode of operation. A plurality of notch filters with different cutoff frequency values may be used and these switchable filters may be switched from one mode of operation to another either simultaneously or successively. In FIG. 14, furthermore, the zero-point adjustment circuit 15 may be inserted between the amplifier circuit 32 and the notch filter 26 and the amplifier circuit 32 itself may be structured to function as a zero-point adjustment circuit.

The notch filter of FIG. 17 may be replaced by another shown in FIG. 18 which can be operated in the notch filter mode as shown in FIG. 18 (a), the low pass filter mode as shown in FIG. 18 (b) and the buffer mode as shown in FIG. 18 (c). The filter shown in FIG. 18 is advantageous furthermore because the number of components is small and hence it is less expensive. It does not require a precision resistor and the attenuation bandwidths cannot be freely adjusted.

To summarize, a signal processing circuit according to this embodiment of the present invention is characterized as having a notch filter behind an amplifier circuit such that the components corresponding to the characteristic oscillation of the associated weighing device with large amplitudes are attenuated. The output from this notch filter is inputted to low pass filters which can be selectably made to function either as filters or as buffers such that they serve as filters after an article batch is thrown into the associated hopper. Weight signals can be stabilized much more quickly and the overall efficiency of the weighing system can be improved. Moreover, since the notch filter effectively attenuates the noise components with largest amplitudes but transmits other signal noise components without delay in response, it can serve as an effective noise filter against signal noise with large amplitudes caused by the free oscillation of the weighing device and, if coupled with low pass filters as shown above, it can efficiently utilize its high-speed and quick-attenuating characteristics.

What is claimed is:

1. A signal processing circuit for a weighing system comprising
    an amplifier circuit for amplifying a weight signal outputted from a weighing device,
    an active filter which serves to attenuate noise components in said weight signal, and
    switching means for selectably switching between a filter mode of operation wherein said active filter functions as a filter and a buffer mode of operation wherein said active filter functions as a buffer.

2. The signal processing circuit of claim 1 wherein said active filter comprises a plurality of stages.

3. The signal processing circuit of claim 2 wherein said active filter comprises a low pass filter.

4. The signal processing circuit of claim 1 wherein said active filter comprises a low pass filter.

5. The signal processing circuit of claim 1 wherein said weighing device comprises a weigh hopper.

6. The signal processing circuit of claim 5 wherein said switching means is set for said buffer mode of operation when articles to be weighed are received by or discharged from said weigh hopper.

7. A signal processing circuit for a weighing system comprising
    a self-check circuit which serves to output a fixed voltage for a self-check of an analog signal processing system in self-check mode of operation,
    an amplifier circuit which serves to add and amplify a weight signal outputted from a weighing device and said fixed voltage outputted from said self-check circuit,
    an active filter which serves to attenuate noise components in said weight signal, and
    switching means for selectably switching between a filter mode of operation wherein said active filter functions as a filter and a buffer mode of operation wherein said active filter functions as a buffer.

8. The signal processing circuit of claim 7 wherein said self-check circuit is adapted to input output-voltage of said weighing device, to output in measurement mode of operation a voltage equal to said inputted voltage, and to output in said self-check mode of operation a voltage which is the sum of said inputted voltage and a fixed reference voltage.

9. The signal processing circuit of claim 7 wherein said active filter comprises a plurality of stages.

10. The signal processing circuit of claim 9 wherein said active filter comprises a low pass filter.

11. The signal processing circuit of claim 7 wherein said active filter comprises a low pass filter.

12. The signal processing circuit of claim 7 wherein said weighing device comprises a weigh hopper.

13. The signal processing circuit of claim 12 wherein said switching means is set for said buffer mode of operation when articles to be weighed are received by or discharged from said weigh hopper.

14. The signal processing circuit of claim 12 wherein said self-check circuit is adapted to be set in said self-check mode when said weigh hopper is empty.

15. A weighing system comprising a signal processing circuit which includes
    an amplifier circuit, and
    an active filter behind said amplifier circuit serving to attenuate noise components in a signal,
    said weighing system further comprising
    a first switching means on the input side of said amplifier circuit adapted to input weight signals in measurement mode of operation and reference signals in adjustment mode of operation, and
    a second switching means in said active filter for selecting between filter mode of operation wherein said active filter functions as a filter and buffer mode of operation wherein said active filter functions as a buffer,
    said second switching means being adapted to select said buffer mode in said adjustment mode.

16. The weighing system of claim 15 wherein said amplifier circuit comprises a high input impedance type differential amplifier.

17. The weighing system of claim 15 wherein said active filter comprises a plurality of stages.

18. The weighing system of claim 17 wherein said active filter comprises a low pass filter.

19. The weighing system of claim 17 wherein said active filter includes a notch filter.

20. The weighing system of claim 15 wherein said active filter comprises a low pass filter.

21. The weighing system of claim 15 wherein said active filter includes a notch filter.

22. The weighing system of claim 15 wherein said reference signal can be switched between a ground level for offset detection and a fixed voltage level for span detection.

23. The weighing system of claim 15 wherein said signal processing circuit further includes a zero-point adjustment circuit for offsetting initial load on weighing device.

24. The weighing system of claim 15 adapted in said adjustment mode to input said reference signal at ground level to detect an offset for said signal processing circuit and to adjust the drift of said signal processing circuit on the basis of said detected offset.

25. The weighing system of claim 15 adapted in said adjustment mode to input said reference signal at a specified voltage level and to adjust span of a weighing device on the basis of a digital value corresponding to said inputted signal.

26. A weighing system comprising a signal processing circuit which includes
    a self-check circuit adapted to input an output terminal voltage of a weighing device and to output a voltage equal to said inputted voltage in measurement mode of operation and a voltage equal to the sum of said inputted voltage and a fixed voltage in self-check mode of operation, an amplifier adapted to add a signal outputted from said weighing device and said voltage outputted from said self-check circuit, and an active filter connected behind said amplifier and adapted to attenuate noise components in a weight signal, said weighing system further comprising a first switching means on the input side of said amplifier circuit adapted to input weight signals in measurement mode of operation and reference signals in adjustment mode of operation, and a second switching means in said active filter for selecting between filter mode of operation wherein said active filter functions as a filter and buffer mode of operation wherein said active filter functions as a buffer, said second switching means being adapted to select said buffer mode in said adjustment mode.

27. The weighing system of claim 26 wherein said active filter comprises a plurality of stages.

28. The weighing system of claim 27 wherein said active filter comprises a low pass filter.

29. The weighing system of claim 27 wherein said active filter includes a notch filter.

30. The weighing system of claim 26 wherein said active filter comprises a low pass filter.

31. The weighing system of claim 26 wherein said active filter includes a notch filter.

32. The weighing system of claim 26 wherein said signal processing circuit further includes a zero-point adjustment circuit for offsetting initial load on weighing device.

33. The weighing system of claim 26 adapted in said adjustment mode to input said reference signal at ground level to detect an offset for said signal processing circuit and to adjust the drift of said signal processing circuit on the basis of said detected offset.

34. A signal processing circuit for a weighing system having an active filter for attenuating noise components in a weight signal, said active filter comprising a notch filter for attenuating components with characteristic frequencies of weigh detecting system and a low pass filter, at least said low pass filter being switchable between filter mode of operation wherein said low pass filter functions as a filter and buffer mode of operation wherein said low pass filter functions as a buffer.

35. The signal processing circuit of claim 34 wherein said weight detecting system comprises a load cell connected to a weigh hopper.

36. The signal processing circuit of claim 35 wherein said low pass filter is in said buffer mode of operation when said weigh hopper is opened or closed.

37. The signal processing circuit of claim 34 wherein said low pass filter comprises a plurality of filters having different attenuation characteristics.

38. The signal processing circuit of claim 37 wherein all of said filters are switched between said modes of operation at the same time.

39. The signal processing circuit of claim 37 wherein said filters are switched between said modes of operation successively.

40. The signal processing circuit of claim 34 wherein said notch filter is switchable between filter mode of operation wherein said notch filter functions as a filter and buffer mode of operation wherein said notch filter functions as a buffer.

41. The signal processing circuit of claim 40 wherein all of said filters are switched between said modes of operation at the same time.

42. The signal processing circuit of claim 40 wherein said filters are switched between said modes of operation successively.

* * * * *